C. MEYER.
POTATO HARVESTER.
APPLICATION FILED JULY 22, 1910.
1,000,186.
Patented Aug. 8, 1911.
3 SHEETS—SHEET 1.
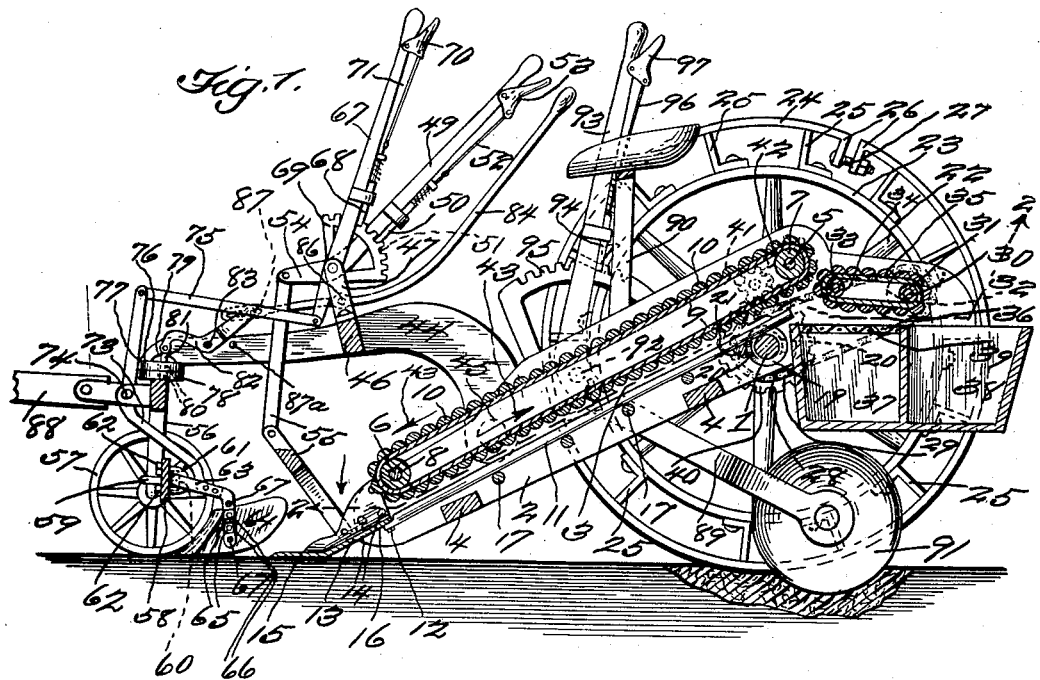
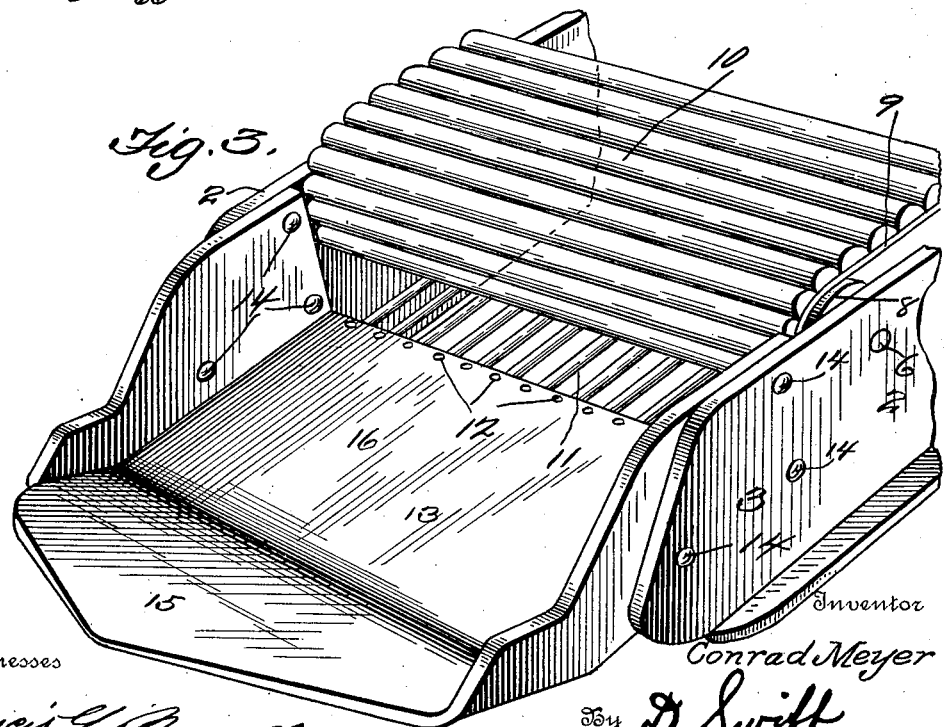
Witnesses
Inventor
Conrad Meyer
By D. Swift
Attorney

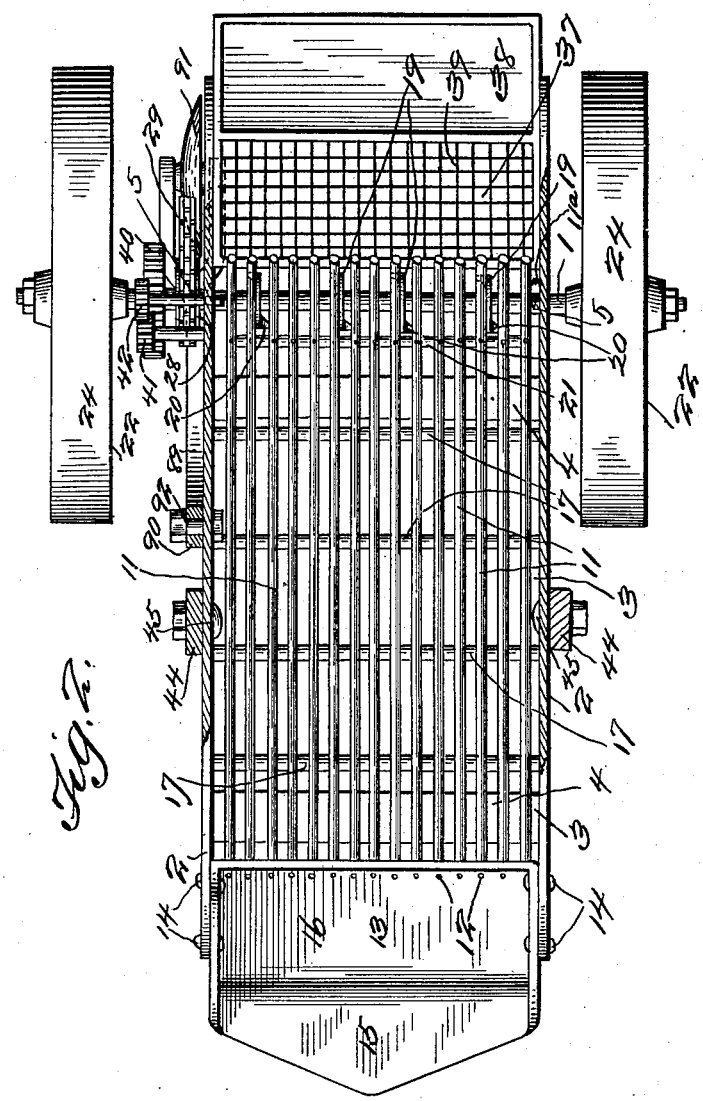

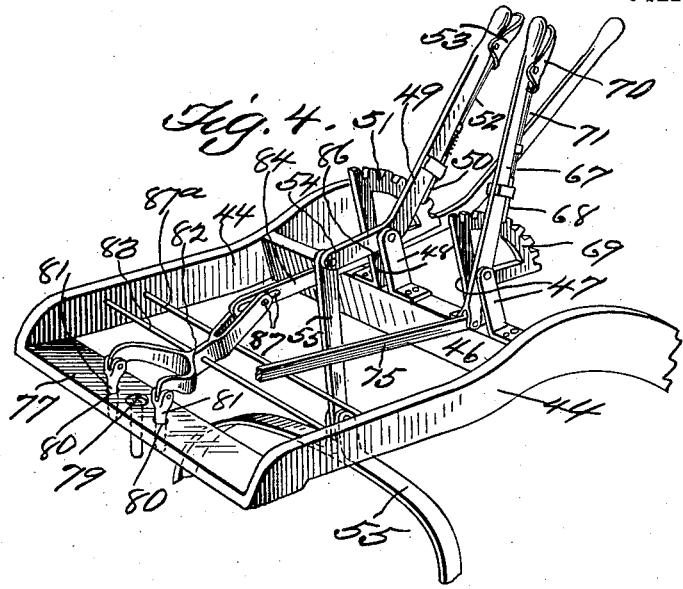

UNITED STATES PATENT OFFICE.

CONRAD MEYER, OF UNION CENTER, WISCONSIN.

POTATO-HARVESTER.

1,000,186. Specification of Letters Patent. Patented Aug. 8, 1911.

Application filed July 22, 1910. Serial No. 573,330.

*To all whom it may concern:*

Be it known that I, CONRAD MEYER, a citizen of the United States, residing at Union Center, in the county of Juneau and State of Wisconsin, have invented a new and useful Potato-Harvester; and I do hereby declare the following to be a full, clear, and exact description of the invention, such as will enable others skilled in the art to which it appertains to make and use the same.

This invention belongs to the art of harvesters, and it primarily pertains to a new and useful potato harvester or digger, by which potatoes are excavated from the soil.
The principal object of the invention is to excavate the potatoes and elevate them by means of a conveyer, and then separate the larger potatoes from the smaller, and deliver them into separate receptacles. When the potatoes are being elevated, the dirt or soil is separated from them, and deposited back in the field.

A further object of the invention is to provide the trough, in which the conveyer is mounted, with a vibrating open work bottom, comprising various rods, the lower ends of which are pivoted to the shovel of the trough, while the upper rearward ends are actuated laterally by means of the cams, carried by the driving shaft of the apparatus.

The invention aims to provide means, located forwardly of the shovel or digger of the trough for plowing or loosening the soil about the potatoes and vines, there being suitable means or mechanism for raising and lowering the said plowing means.

In this form of harvester, a further feature of the invention exists, which comprises means for raising and lowering the shovel or digger end of the trough, in order that such shovel or digger end may be raised clear of the soil, or projected farther therein.

Another feature of the invention is to provide the shovel or digger end of the trough with a horizontally arranged portion, which is disposed angularly with the remaining shovel or digger end of the trough.

By pivotally arranging the side beams to the trough of the conveyer, and by manipulating the raising and lowering means for the shovel or digger end of the trough, the said trough may have a pivotal action with regard to the beams, thereby throwing the weight of the trough upon the frame of the forward wheels of the apparatus. The side beams are suitably braced, as shown.

In other devices of this character the forward wheels thereof do not turn, for instance, upon a pivotal point of the forward portion of the apparatus, but in the present device the frame of the forward wheels is pivoted to the side beams of the apparatus, so that, when the apparatus reaches the end of a row of potatoes, the operator thereof may manipulate a lever in order to withdraw dowel pins (which hold the forward wheels rigidly with regard to the frame of the apparatus) in order that the said forward wheels may turn with the tongue of the harvester and as one body.

A further feature of the invention is to prevent the apparatus from sliding laterally down hill, when harvesting or digging potatoes upon an incline.

The drawings only disclose one form of the invention, but, however, in practical fields this form may require changes and alterations, to which the applicant is entitled, provided such changes and alterations are comprehended by the claims herewith appended.

In the drawings:—Figure 1 is a longitudinal sectional view through a harvester, embodying the various features of the invention. Fig. 2 is a sectional view on line 2—2 of Fig. 1, clearly disclosing the laterally vibrating open work bottom, means for laterally vibrating the same and further disclosing in plan view, the shovel or digger end of the harvester. Fig. 3 is a perspective view of the shovel or digger end of the harvester, showing clearly a portion of the conveyer. Fig. 4 is a detail perspective view of the side beams (which have a pivotal connection with the arched frame of the forward wheels) showing the means for raising and lowering the plows, the means for raising and lowering the shovel or digger end of the harvester, and the means for releasing the arched frame, whereby the forward wheels may be allowed to turn with the tongue. Fig. 5 is a detail view, showing the driving shaft and the cams thereon for laterally actuating or vibrating the rear upper ends of the bars of the bottom of the trough. Fig. 6 is an enlarged detail sectional view of a shovel or digger end of a harvester, showing the pivotal connection between shovel end and the bars or rods of the open work bottom of the trough. Fig. 7 is a detail view showing a portion of the shaft 1 as provided with a modified means for laterally oscillating the rear ends of the rods 11.

As to the drawings, 1 denotes the driving shaft or axle of the harvester, which is mounted in suitable bearings of the side bars 2 of the trough 3 of the apparatus. The side bars of the trough are braced by the transverse bars 4.

5 and 6 represent shafts having rollers 7 and 8, about which the canvas conveyer belt 9 travels. This conveyer belt is provided with a plurality of slats 10, which engage the potatoes sufficiently to force or convey them upwardly and rearwardly upon the bars 11 of the open work bottom of the trough. The bars 11 are pivoted upon the bolts 12 of the shovel or digger end 13 of the trough. This shovel or digger end is secured by bolts 14, between the side bars 2 of the trough, as shown clearly in Fig. 3. The shovel or digger end of the harvester is provided with the horizontal portion 15, which extends angularly, with relation to the portion 16 thereof. Transverse rods 17 are arranged between the side bars of the trough, for the support of the rods or bars 11.

The rear upper ends of the bars or rods 11 rest upon the driving shaft or axle of the apparatus, and arranged between two or more of the rods 11, are wheels 19 having cam portions 20, which coöperate with the rods in order to laterally vibrate or actuate the rods, so as to shake the potatoes in order to loosen the dirt or soil about them. The rods 11 are joined together by the transverse bar or rod 21, in order to cause the rods 11 to vibrate in unison.

The driving shaft or axle 1 has journaled thereon at each end the driving wheels 22, from the rims 23 of which the projections (in the form of angular plates) radially project, in order to cause the wheels to readily and properly track through the field. When the shovel or digger end of the harvester is raised, and the harvester is being transferred from one destination to another, annular bands 24 are provided, which are slipped about the projections or angular plates 25, as shown clearly in Fig. 1. The ends 26 of the bands are angular, as shown, there being a slight space arranged between the ends, in order to allow the bands to be securely tightened about the projections, by means of the bolts 27.

Journaled upon the driving shaft or axle 1, in order to rotate therewith, is a sprocket wheel 28, about which a sprocket chain 29 travels. This sprocket chain 29 also travels about a sprocket wheel 30 (which is designed to rotate with the shaft 31). This shaft 31 is provided with a roller 32, and is journaled in bearings of the side bars 2 of the trough.

33 represents a shaft similar to the shaft 32, which is also provided with a roller 34, about which and the roller 32 a canvas conveyer belt 35 travels. This conveyer belt 35 has a plurality of transverse slats 36, which are designed to engage frictionally with the potatoes, in order to force the potatoes into the receptacles 37 and 38, the smaller potatoes passing through the screen 39, while the larger potatoes are deposited into the receptacle 38.

Also designed to rotate with the shaft or axle 1, is the gear 40, which meshes with the pinion 41, which in turn meshes with the pinion 42. The pinion 42 is carried by and designed to rotate with the shaft 5, in order to impart motion to the conveyer belt 9, in the direction of the arrow 43, so that the potatoes may be forced upwardly upon the inclined open work bottom of the trough.

44 represents side beams of the apparatus, which are pivoted at 45, to the side bars of the trough. The beams 44 are braced by the transverse beam 46, and projecting from this transverse beam 46 are the ears or projections 47 and 48, the purpose of which will hereinafter appear. Pivoted between the ears or projections 48 is a lever 49 having a spring actuated dog or bolt 50, to coöperate with the teeth of the quadrant 51, so as to hold the lever in various positions. This dog or bolt 50 has connected to it a rod 52, which in turn pivots to a hand grip 53, by which the dog or bolt may be released from engagement with the teeth of the quadrant. Connected between the end 54 of the lever 49 and the shovel or digger end of the trough, is a two-part link 55, in order that when the lever 49 is manipulated in one direction or the other, the shovel or digger end of the harvester may be raised or lowered.

56 represents an arched frame, the outwardly extending spindle ends of which have mounted thereon the forward wheels 57 of the harvester. A plate 58 is fastened transversely of the arched frame, by means of the staples 59 and nuts 60. Staples 61 penetrate the plate 56, and to the ends of the staples 61, nuts 62 are threaded. Mounted in the staples 61 is a frame 63 (which is U-shaped in top plan view) to the lower or downwardly extending ends of which the plows 64 are adjustably connected. The plows 64 are adjustably connected through the medium of the bolts 65, the nuts 66 and the apertures 67 (which apertures are formed in the downwardly extending end of the frame 63). These plows have their mold boards facing one another, and are designed for the purpose of plowing and loosening the soil about the potatoes. The object of disposing the mold boards so as to face one another, is to throw the vines and the potatoes toward the center of the harvester, in order that they may be readily picked or shoveled up, by the shovel or digger end of the trough. To raise and lower the plows 64, a lever 67 is pivoted between the ears or projections 47, it being provided with a spring actuated dog or bolt 68 similar to the bolt or dog 50, and designed to co-act with the teeth of the quadrant 69.

70 represents a hand grip (which has connected between it and the dog or bolt 68 a rod 71) by which the dog or bolt 68 is disengaged from the teeth of the quadrant, in order to move the lever 67 in one direction or the other. In moving the lever 67 in one direction or the other, the plows 64 are raised or lowered, through the medium of the angular bar or arm 73 (which is pivoted or fulcrumed at 74 of the arched frame), and the link 75. The angular bar or arm projects forwardly and upwardly from the frame 63, and from one side thereof.

The arched frame 56 is provided with a fifth wheel connection between it and the beams 44. This fifth wheel connection 76 comprises the plates 77 and 78. The plate 77 is carried by the beams 44, while the plate 78 is carried by the arched frame 56, and passing through the plates is the king bolt 79, in order to hold the plates 77 and 78, the beams 44 and the frame 56 pivotally connected. Upon each side of the king bolt, the plates 77 and 78 are provided with registering apertures 80, through which the dowel pins 81 are adapted to extend, in order to hold the arched frame 56 rigidly at right angles to the beams 44. These dowel pins 81 are pivotally carried by the forked end of the bell crank lever 82, which is pivoted upon the rod 83 of the beams 44. To withdraw the dowel pins from the apertures of the plate 78, a lever 84 is fulcrumed to the side of one of the ears or projections 48, as shown at 86, and has a slot and pin connection 87 with one end of the bell crank lever 82. The bell crank lever 82 is limited in its movement by the rod 87ª. By pushing forward upon the lever 84, the dowel pins will be withdrawn from the apertures of the plate 78, then the arched frame will be allowed to turn with the tongue 88 of the harvester, and with the arched frame 56 the forward wheels will also move.

When this form of harvester is being operated in the field, and upon an incline, a device 89 is provided to prevent the harvester from slipping. This device 89 comprises the angular lever 90, in the forked end of which the colter wheel or disk 91 is mounted. This colter wheel 91 is designed to be buried, forced or cut into the soil or ground as shown clearly in Fig. 1, the object of which being perfectly apparent. This lever 90 is fulcrumed at 92, and the upwardly extending arm 93 of which is provided with the usual form of spring-actuated dog or bolt 94, which is designed to coöperate with the teeth of the rack 95, in order to hold the lever 90 in various positions, thereby holding the wheel 91 out of or into the ground or soil.

96 represents a rod, which connects between the spring actuated dog or bolt and the hand grip 97, by the manipulation of which the spring actuated dog or bolt may be disengaged from the teeth of the quadrant 95.

From the foregoing description, it is clearly evident that a novel form of potato harvester or digger is produced, whereby potatoes may be plowed, excavated, elevated, and when being elevated, the dirt or soil is separated therefrom and deposited back in the field, and then the larger potatoes are separated or screened from the smaller potatoes, both being then deposited in separate receptacles.

The invention having been set forth, what is claimed as new and useful is:—

1. In a potato harvester, a digger member having transversely arranged rods, rods pivoted at their forward ends and resting upon the transverse rods, a drive shaft extending transversely of the rear portion of the digger member and provided with means for oscillating the rear portions of the pivoted rods, and a conveyer member arranged immediately above the pivoted rods and parallel thereto.

2. In a potato harvester, a trough like digger member having transversely arranged fixed supporting rods and provided with longitudinally extending rods pivoted at their forward ends to the digger member and resting upon the transversely arranged rods, a drive shaft extending transversely of the rear portion of the digger member and provided with cams for oscillating laterally the pivoted rods, and a conveyer member parallel with the pivoted rods and disposed immediately above the same.

3. In a potato harvester, a trough-like digger member having a forward shovel end and provided with transversely arranged fixed supporting rods, rods extending longitudinally of the trough-like digger member and pivoted to the shovel end, and movable upon the fixed rods, a drive shaft extending transversely through the rear of the trough-like digger member and provided with means to engage the rear ends of the longitudinally extending rods for oscillating them laterally, and a conveyer member arranged parallel to the pivoted rods and immediately above the same, and a receptacle for receiving the potatoes after being elevated.

4. In a potato harvester, a trough-like digger member having transversely arranged fixed supporting rods and provided with longitudinally extending rods pivoted at their forward ends to the digger member and resting upon the transversely arranged rods, a drive shaft extending transversely of the rear portion of the digger member and provided with cams for oscillating laterally the pivoted rods, a conveyer member parallel with the pivoted rods and disposed immediately above the same, and means connecting the rear ends of the longitudinally arranged rods for causing them to move in unison.

5. In a potato harvester, a trough-like digger member having a forward shovel end and provided with transversely arranged fixed supporting rods, rods extending longitudinally of the trough-like digger member and pivoted to the shovel end, and movable upon the fixed rods, a drive shaft extending transversely through the rear of the trough-like digger member and provided with means to engage the rear ends of the longitudinally extending rods for oscillating them laterally, and a conveyer member arranged parallel to the pivoted rods and immediately above the same, means connecting the rear ends of the longitudinally arranged rods for causing them to move in unison, and a receptacle for receiving the potatoes after being elevated.

6. In a potato harvester, a trough-like digger member having a shovel end provided with a substantially horizontal portion, the trough-like digger member having transversely arranged fixed rods and provided with inclined rods movable upon the fixed rods and pivoted to the shovel end, a rod connecting the rear portions of the inclined rods so as to cause them to move in unison, a drive shaft extending transversely of the trough-like digger members and provided with a plurality of disk members having laterally projecting cam portions extending between the rear ends of the inclined rods for oscillating them laterally, and a conveyer member arranged parallel to the inclined rods and immediately above the same.

In testimony whereof I have signed my name to this specification in the presence of two subscribing witnesses.

CONRAD MEYER.

Witnesses:
 DEAN SWIFT,
 ROBERT A. BOSWELL.

Copies of this patent may be obtained for five cents each, by addressing the "Commissioner of Patents, Washington, D. C."